April 3, 1962 R. F. McGIVERN 3,028,011
AEROBIC DIGESTION SYSTEM FOR USE IN SEWAGE TREATMENT
Filed Sept. 14, 1960 3 Sheets-Sheet 1

INVENTOR.
ROBERT F. McGIVERN
BY
MAHONEY MILLER & RAMBO ATTY'S.
BY Wm. V. Miller

INVENTOR.
ROBERT F. McGIVERN
BY
MAHONEY MILLER & RAMBO ATTY'S.
BY Wm. V. Miller

United States Patent Office 3,028,011
Patented Apr. 3, 1962

3,028,011
AEROBIC DIGESTION SYSTEM FOR USE IN
SEWAGE TREATMENT
Robert F. McGivern, P.O. Box 3503, Beechwold Station,
Columbus, Ohio
Filed Sept. 14, 1960, Ser. No. 55,908
2 Claims. (Cl. 210—220)

My invention relates to an aerobic digestion system for use in sewage treatment. It has to do, more specifically, with an aerobic digestion system for use in connection with the activated sludge process of sewage treatment.

At the present time in the activated sludge process of sewage treatment, in order to obtain aerobic digestion, it has been customary to provide two tanks, namely, a large aeration tank and a relatively small final tank. The raw sewage enters the large tank and is subjected to a violent rolling or tumbling action by means of air under pressure discharged into the mixed liquor through suitably located submerged air diffusers. This resulting feeding of oxygen into the liquor brings about the aerobic digesting action and, after a suitable period, producing a treated liquid which is discharged into the final smaller tank. In the final smaller tank, the treated liquid is held for a suitable period, to allow settling of sludge, and is then discharged, usually into a stream, as treated sewage. It is necessary to return the sludge from the final tank back to the aeration tank for further treatment by aeration and to "reseed" the mixed liquor but it will be understood that this is difficult to do because the nature of the sludge makes it difficult to provide a return flow by gravity or even to force it back under pressure by means of pumps. With this prior art process, there is difficulty in returning the sludge from the final tank to the aeration tank.

It is the main object of my invention to provide an aerobic digestion system for use in the activated sludge process of sewage treatment which uses a main aeration treating compartment for receiving the raw sewage and an associated final compartment into which the treated sewage is discharged and which provides for the continuous and automatic return of the sludge from the final compartment back to the aeration compartment for further treatment.

Another object of my invention is to provide a system of the type indicated which can be controlled readily to determine the rate at which the sludge from the final compartment is returned to the aeration compartment.

A further object of my invention is to provide a system in which a violent tumbling or rolling action is created in the aeration compartment and the degree of this tumbling or rolling action can be controlled.

A further object of this invention is to provide a system of the type indicated in which the aeration action in the large compartment and the return of the sludge from the final compartment are related and are controlled simultaneously.

Another object of my invention is to provide a system of the type indicated which employs a more simple tank arrangement and more simple associated apparatus than is employed with the prior art aerobic digestion system of the activated sludge type sewage treatment process.

Various other objects will be apparent.

According to my invention, I provide a tank which is divided into a large aeration treating compartment for receiving the raw sewage and a smaller connected final compartment for receiving the mixed liquor from the large compartment. The tank is divided by a baffle arrangement which will permit the continuous return of sludge from the final compartment to the aeration compartment. Associated with this baffle arrangement are air diffusers which are so located that they not only provide means for causing the return of the sludge from the final compartment to the aeration compartment but they also serve to create the violent rolling or tumbling action in the aeration compartment. These air diffusers and the associated baffles are either or both adjustable to vary the rate of return of the sludge from the final compartment and to vary the violence of the tumbling or rolling action in the aeration compartment.

In the accompanying drawings, I have illustrated the sewage treating system of my invention and in these drawings.

Figure 1:
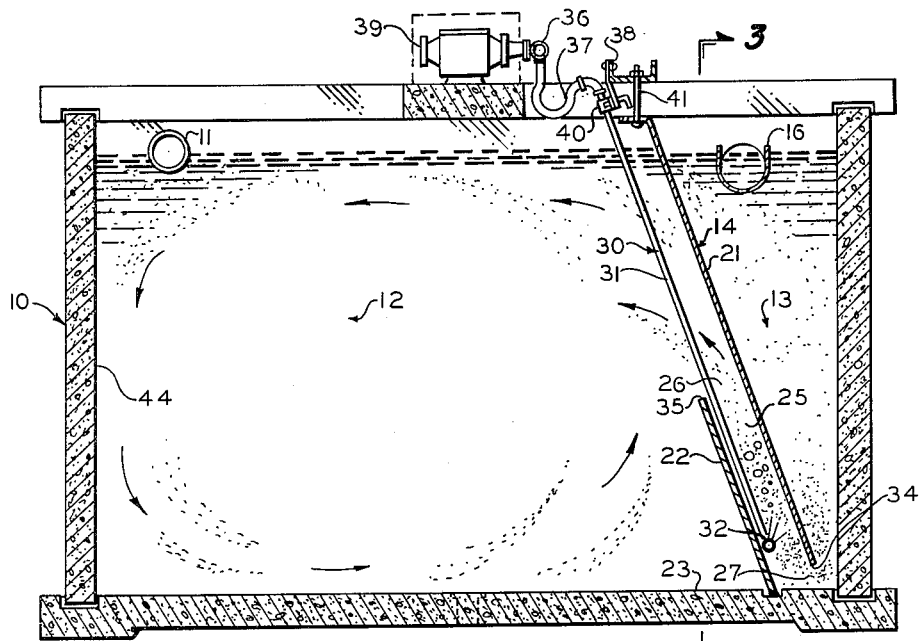
FIGURE 1 is a transverse vertical sectional view taken along line 1—1 of FIGURE 3 through a treatment tank in which my invention is embodied.

With reference to the drawings, I have illustrated apparatus in which my invention is embodied and which consists of a large elongated tank 10 preferably of rectangular form. This tank has an inlet 11 at one corner thereof and adjacent its upper edge through which raw sewage is introduced into the tank. The elongated tank is divided into two compartments 12 and 13 by a baffle unit 14 extending the full length thereof. A passage or opening 15 is provided in the upper end of the baffle unit 14 at one corner thereof and leads from the compartment 12 to the compartment 13, this passage being at a lower level than the inlet 11 and being adapted to conduct the treated or aerated liquid from the compartment 12 into the final compartment 13. From the compartment 13 the final treated sewage liquid is discharged through an outlet 16. The inlet 11 for raw sewage and the outlet 16 for the final treated sewage may be controlled by suitable valves. However, the circulation between the compartments 12 and 13 is continuous, as will later appear.

The baffle unit 14 extends the full length of the tank 10 and, consequently, the compartments 12 and 13 will extend the full length thereof. The baffle unit comprises an upper baffle or wall 21 which extends throughout the greater portion of the depth of the tank and a lower baffle 22 which contacts or is set into the bottom 23 of the tank. The baffles 21 and 22 are in laterally inclined but parallel relationship, the inclination being such that the final compartment 13 is of substantially V-cross section transversely of the tank whereas the treating compartment 12 has its side walls converging toward their upper ends.

As indicated above, the baffle 22 contacts the tank bottom 23 and extends upwardly and inwardly toward the longitudinal axis of the tank. It overlaps the lower portion of the baffle 21 but is spaced inwardly thereof to provide a narrow chamber 25 between the overlapping portions of the baffles 21 and 22. This chamber is elongated and narrow, extending the full length of the tank, and has an upper outlet 26 extending the entire length which opens upwardly into the treating compartment 12. The lower edge of the baffle 21 is spaced from the tank bottom and provides an inlet 27 leading inwardly and upwardly into the chamber from the compartment 13.

Figure 2:
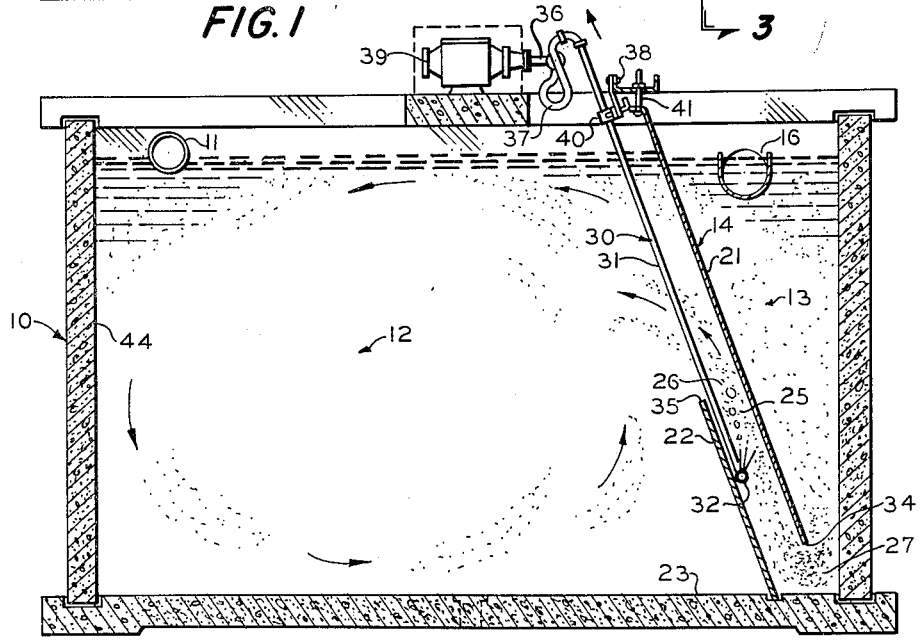
FIGURE 2 is a view similar to FIGURE 1 but showing the air diffusers adjusted to a different position.
Figure 3:
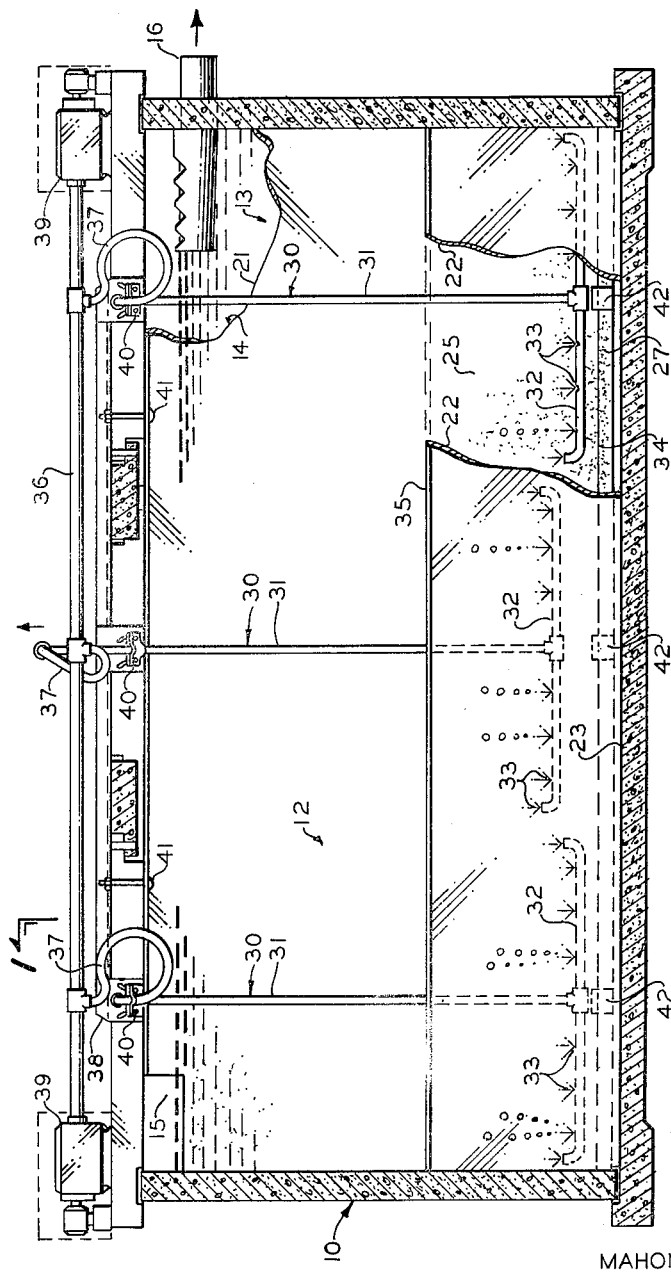
FIGURE 3 is a longitudinal vertical sectional view taken through the tank substantially along line 3—3 of FIGURE 1.

For producing the swirling or tumbling action of the mixed liquor in the compartment 12 and for returning sludge continuously from the narrow lower end of the compartment 13, I provide the air diffuser units 30. Each unit is of inverted T-form and comprises a supply pipe 31 which extends downwardly parallel to the baffle 21 and which has a diffuser branch 32 on its lower end. The branch 32 is provided with a plurality of longitudinally spaced air outlet openings 33 which are directed upwardly. Any suitable number of units 30 may be provided but it will be understood that the branches 32 will extend substantially throughout the full length of the tank (FIGURE 3). The air diffusing branches 32 will be located in the chamber 25 intermediate the height thereof (FIGURES 1 and 2) or intermediate the lower edge 34 of the baffle 21 and the upper edge 35 of the baffle 22. The supply pipes 31 are connected by means of flexible connections 37 to a manifold 36 which is connected to suitable sources 39 of air under pressure. Each pipe 31 is carried by a support 38 which extends the full length of the tank at the top side thereof. Each pipe 31 is removably clamped by a supporting clamp 40 so that each pipe 31 can be adjusted vertically to vary the level of its associated air diffuser branch 32 in the chamber 25. Thus, the space or chamber 25 provides a confined passageway which establishes communication between the lower ends of the compartments 12 and 13, and which is directed upwardly and inwardly from the narrow lower portion of the compartment 13 and into the compartment 12.

The baffle 21 is preferably carried by screws 41 supported from the support 38 so that it can be adjusted vertically to vary the position of its lower edge 34 relative to the tank bottom 23. The size of the inlet 27 can be varied without varying the vertical position of the edge 34 by inserting baffle blocks 42 (FIGURE 3) at spaced intervals along the inlet 27.

In the uses of this system, the baffle 21 is adjusted so that its edge 34 is spaced a suitable distance above the tank bottom 23 to provide an inlet 27 of suitable height. If desired, the blocks 42 may be inserted in suitable number to vary the size and capacity of the inlet 27 but still keep the edge 34 at a desired level. The pipes 31 will be adjusted vertically to adjust the diffusers 30 to proper levels in the chamber or restricted passage 25. The tank compartment 12 is filled with mixed liquor and the treatment is started by introducing the air through the diffusers 30.

The air being forced from the diffuser branches 32 will be directed upwardly from the air outlets 33 through the chambers 25 and out the outlet 26 into the compartment 12. It will be directed inwardly by the inclined baffle 21 toward the opposite outer wall 44 of the compartment 12. The specific gravity of the liquid in the compartment 12 above the outlet 26 will be reduced and this will cause the entire body of mixed liquor in the tank 10 to roll counter-clockwise about its axis so as to aerate the liquid.

Figure 4:
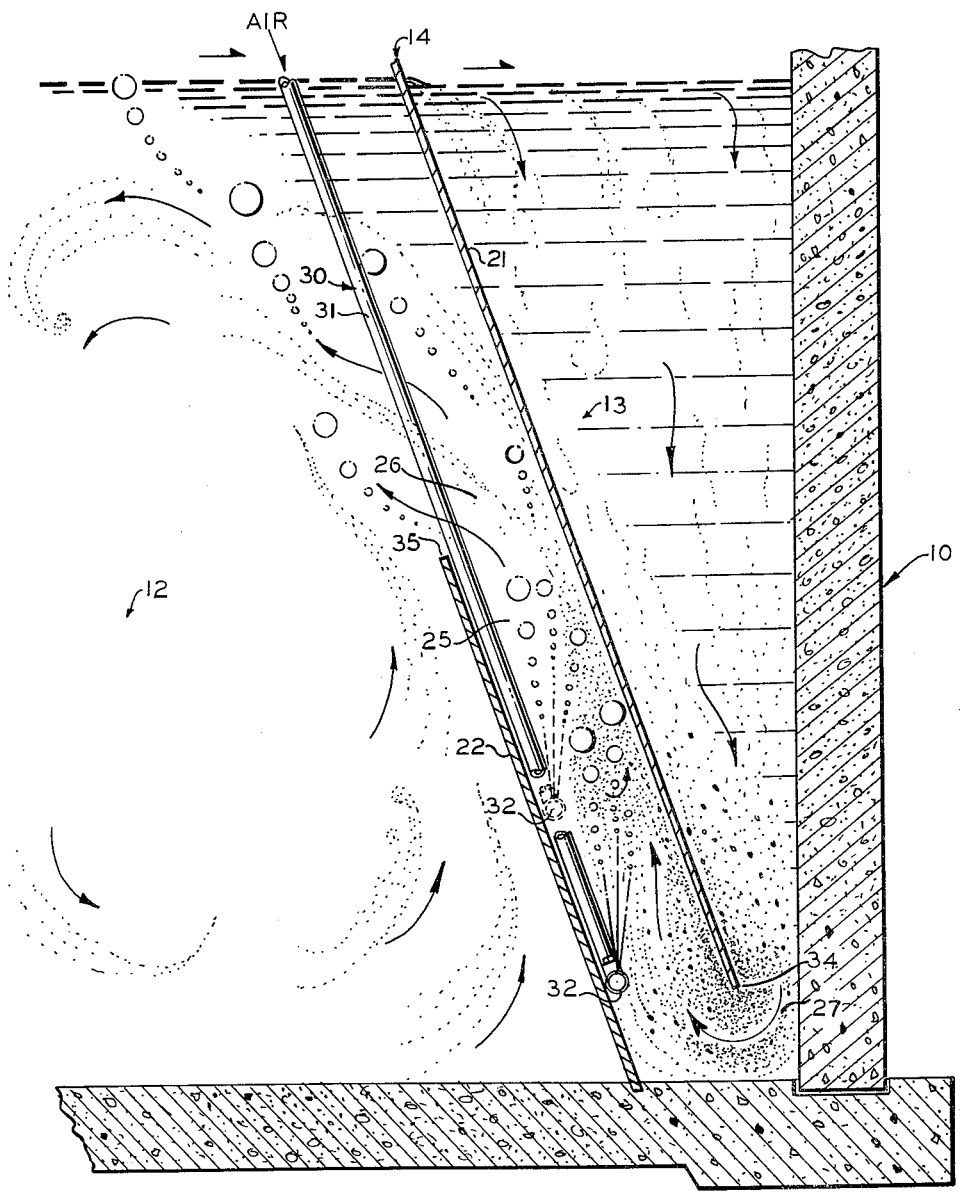
FIGURE 4 is an enlarged schematic detail of the baffle arrangement and associated air diffuser and illustrating the action of these units.

The aerated liquid will pass through the outlet 15 into the upper wider end of the compartment 13, and some of the sludge will deposit therefrom into the narrow bottom portion of the final compartment 13. Due to the airlift action of the diffusers 30, this will draw sludge particles upwardly from the bottom of the compartment 13 through the inlet 27 into the chamber 25 and force it on upwardly into the compartment 12 where it will join the swirling and tumbling mixed liquor therein and will be retreated, as indicated in FIGURE 4.

The extent of the rolling action in the aeration treating compartment may be controlled by the vertical position of the diffuser branches 32 and the position of these branches in the chamber 25 also controls the speed of removal of the sludge deposit from the bottom of the compartment 13. Also, the speed of removal of this sludge may be controlled by the area of the inlet 27. Either or both of these control arrangements may be employed in controlling the rate of removal of sludge from the final compartment 13.

It will be apparent that I have provided an aerobic digestion system for use in treating sewage which is much more effective than prior art systems. The system is continuous and the sludge is returned from the final compartment to the treating compartment more efficiently. Also, simple, inexpensive apparatus can be used for the system.

Having thus described my invention, what I claim is:

1. A sewage treating system comprising a tank of substantially rectangular horizontal cross-section and being of suitable depth, a vertically positioned baffle unit in said tank spaced from opposed side walls thereof and extending the full length thereof to divide the tank into a treating compartment for raw sewage and a final compartment, an inlet for raw sewage leading into the upper portion of said treating compartment and an outlet for treated sewage leading from the upper portion of said final compartment, said baffle unit comprising a first baffle extending throughout the greater portion of the depth of the tank but having its lower edge spaced from the bottom of the tank to provide a space therebetween and having an opening in its upper portion for permitting treated sewage to flow from the treating compartment into the final compartment, a second baffle which is disposed inwardly of the first baffle toward the treating compartment in spaced relationship therewith, said second baffle extending from the bottom of the tank upwardly and overlapping the first baffle to provide a narrow restricted passage having an outlet into the treating compartment at the upper edge of the second baffle with the space at the lower edge of the first baffle serving as an inlet thereinto, and air diffusers in said passage intermediate the height of said second baffle for aerating the sewage in the treating compartment through said passage outlet and withdrawing sludge from the lower end of the final compartment through said passage inlet.

2. A sewage treating system comprising a tank of substantially rectangular horizontal cross-section and being of substantial depth, a vertically positioned baffle unit in said tank spaced from opposed side walls thereof and extending the full length thereof to divide the tank into a treating compartment for raw sewage and a final compartment, an inlet for raw sewage leading into the upper portion of said treating compartment and an outlet for treated sewage leading from the upper portion of said final compartment, said baffle unit comprising a first baffle extending throughout the greater portion of the depth of the tank but having its lower edge spaced from the bottom of the tank to provide a space therebetween and having an opening in its upper portion for permitting treated sewage to flow from the treating compartment into the final compartment, a second baffle which is disposed inwardly of the first baffle toward the treating compartment in spaced relationship therewith, said second baffle extending from the bottom of the tank upwardly and overlapping the first baffle to provide a narrow restricted passage having an outlet into the treating compartment at the upper edge of the second baffle with the space at the lower edge of the first baffle serving as an inlet thereinto, and air diffusers in said passage intermediate the height of said second baffle for aerating the sewage in the treating compartment through said passage outlet and withdrawing sludge from the lower end of the final compartment through said passage inlet, said first baffle extending at an angle outwardly toward the associated side wall so that the said final compartment is V-shape in transverse vertical cross-section with the inlet into said restricted passage being at the converging lower portion of said final compartment, said second baffle being in parallel relationship to the first baffle, said air diffusers being vertically adjustable in said restricted passage.

References Cited in the file of this patent

UNITED STATES PATENTS

| | | |
|---|---|---|
| 1,139,024 | Frank | May 11, 1915 |
| 2,473,323 | Zack | June 14, 1949 |

FOREIGN PATENTS

| | | |
|---|---|---|
| 465,209 | Germany | Aug. 30, 1928 |